April 2, 1968  K. J. HEINICKE ET AL  3,375,592
TRAVELING DRYER FOR VEHICLE WASHING APPARATUS
Filed Aug. 30, 1965  3 Sheets-Sheet 1
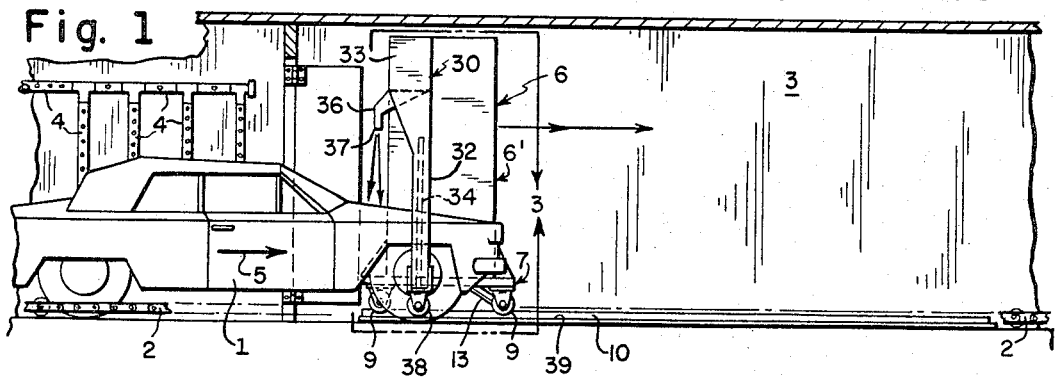
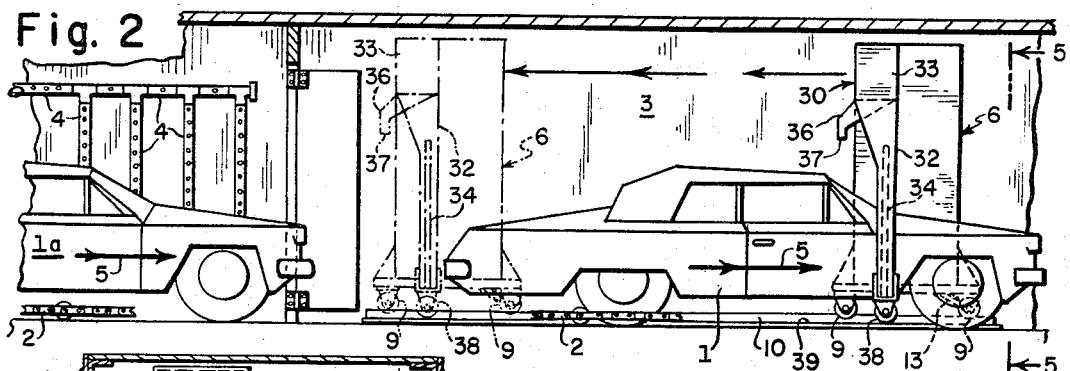
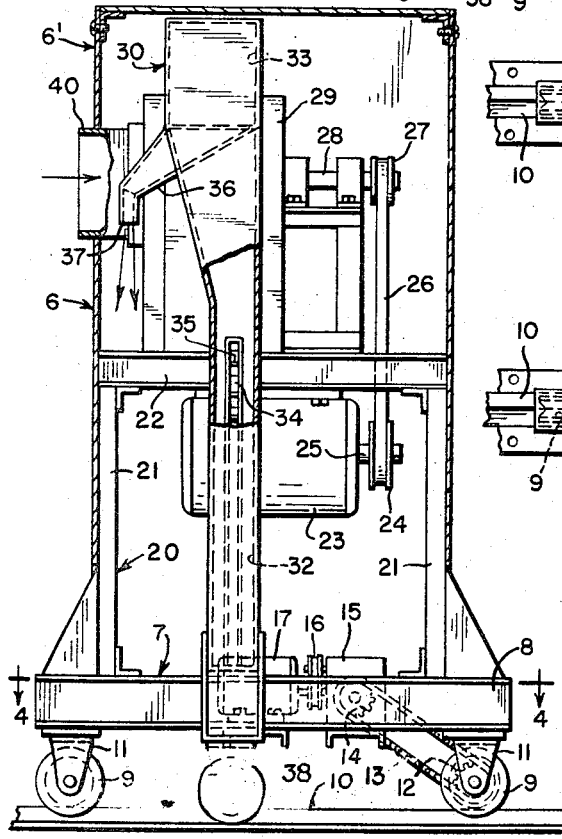
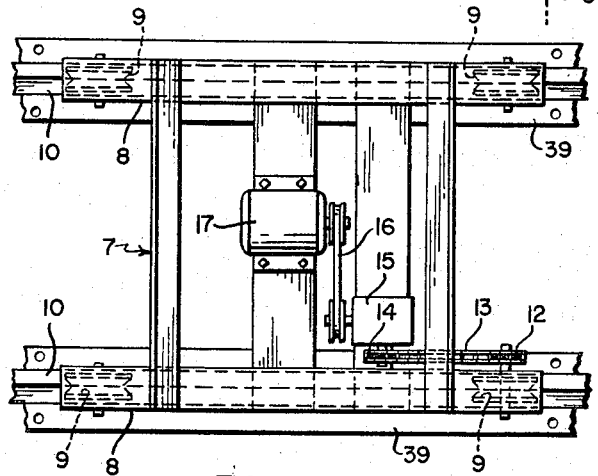
INVENTORS.
KURT J. HEINICKE
PAUL K. SHAFER
BY
ATTORNEY

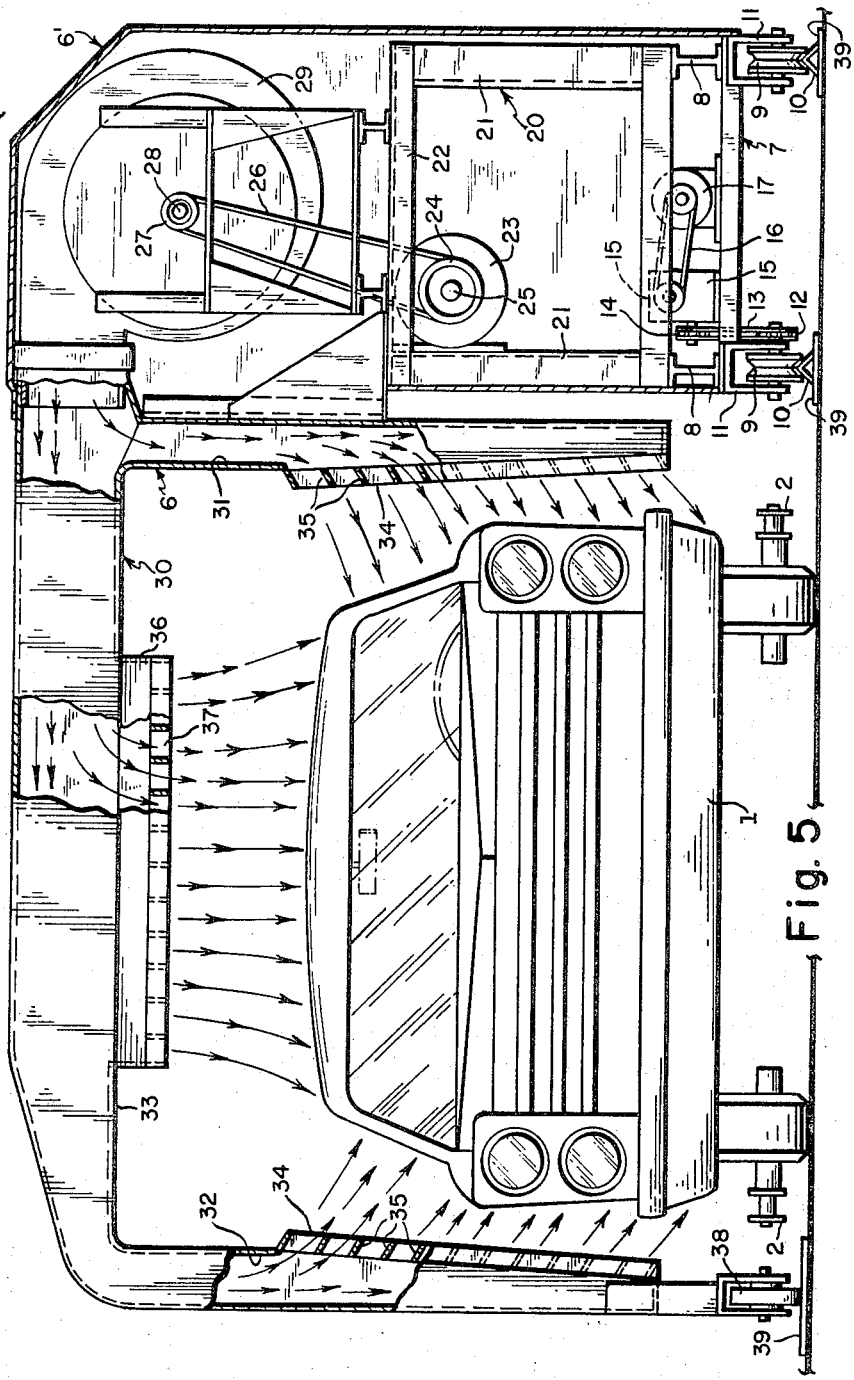

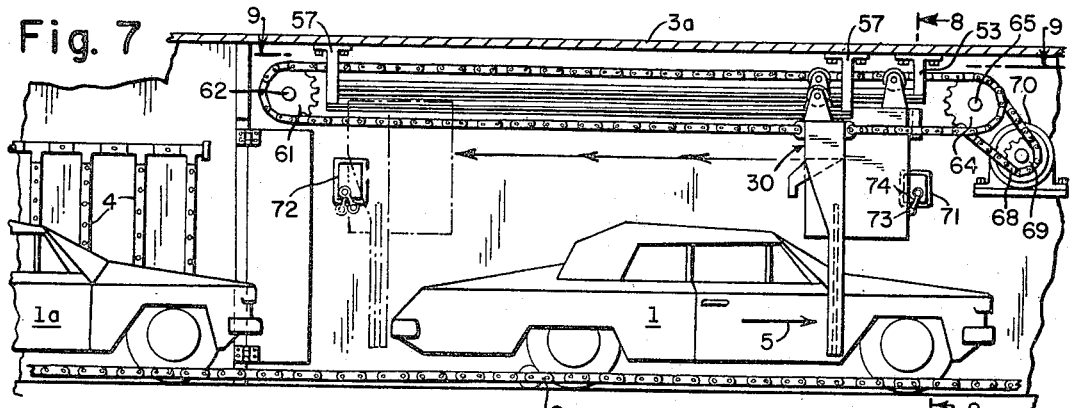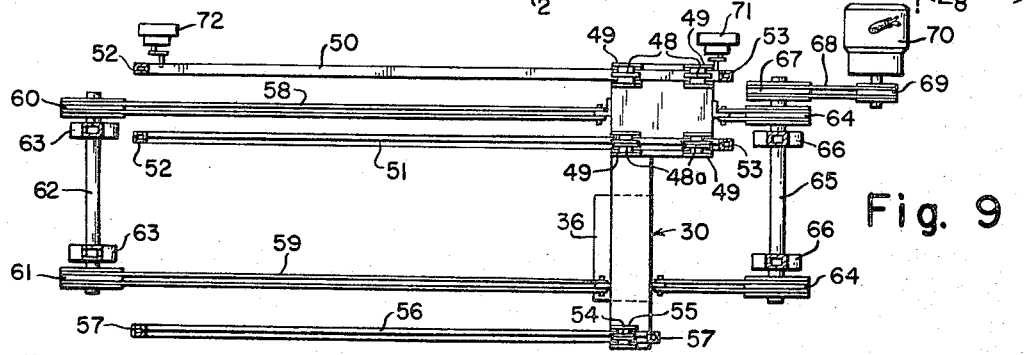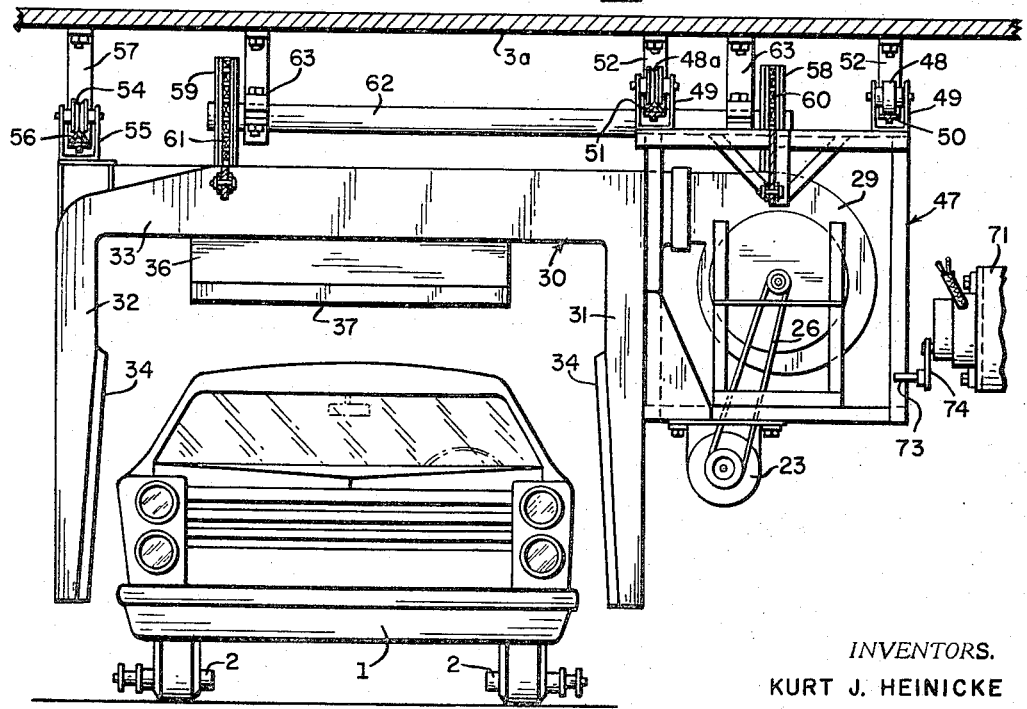

United States Patent Office 3,375,592
Patented Apr. 2, 1968

3,375,592
TRAVELING DRYER FOR VEHICLE
WASHING APPARATUS
Kurt J. Heinicke and Paul K. Shafer, Hollywood, Fla., assignors to Heinicke Instruments Co., Hollywood, Fla., a corporation of Florida
Filed Aug. 30, 1965, Ser. No. 483,703
3 Claims. (Cl. 34—87)

ABSTRACT OF THE DISCLOSURE

A car-drying apparatus of a type particularly adapted for the drying of cars after they have been subjected to washing and rinsing in a so-called "car wash," and while the car is in movement, the apparatus including a movable blower and nozzle structure disposed alongside of the carriage by which the car is moved. The nozzle structure is arranged to project air over the top and sides of the moving car. During the drying operation, both the blower means and the car are in forward movement, with the car travelling at a forward rate of speed greater than the forward movement of the blower means. At the end of travel of the blower means, the direction of movement of the blower means is reversed to bring it back to a position where the front end of a succeeding car enters under the nozzle structure.

---

This invention relates to car-drying apparatus and more particularly to an apparatus for drying an automobile in a so-called "car wash" after the automobile has been subjected to the usual washing and rinsing operations, and with the drying apparatus effective to result in the car emerging clean and shining at the conclusion of the drying treatment.

It is an object of the invention to provide an apparatus of this kind which will be highly effective in operation; which will secure complete drying of the car in a minimum amount of time and without delaying the travel of the car through its cleaning cycle.

More particularly, the invention contemplates the provision of an inverted U-shaped nozzle structure or air manifold which projects air over the top and against the sides of the car to be dried; of a blower connected to the nozzle structure or air manifold for the supply of the air; of a carriage for transporting the blower and the attached nozzle structure along with the car to be dried and preferably at a lesser rate of speed than the speed of travel of the car being dried; with the carriage arranged to be suspended from overhead rails or operative along ground rails, and with means for reversing the direction of travel of the carriage at the end of its travel in one direction to thereby bring it back to its starting point where another car reaches it to begin the drying treatment.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is an elevational view, with parts in section, of an automobile washing and drying apparatus in which the improved drying device is incorporated;

FIG. 2 is a similar view, on an enlarged scale, of a part of the apparatus;

FIG. 3 is a sectional view of the portion of the apparatus that is included in the surrounding line 3 in FIG. 1;

FIG. 4 is a sectional view, taken substantially on the line 4—4 of FIG. 3, looking in the direction of the arrows;

FIG. 5 is a view taken substantially on the line 5—5 of FIG. 2, looking in the direction of the arrows;

FIG. 6 shows a modified arrangement for the carriage rollers and tracks;

FIG. 7 shows an arrangement by which the blower carriage is supported on overhead tracks and is driven by a chain and sprocket arrangement;

FIG. 8 is a sectional view, taken substantially on the line 8—8 of FIG. 7, looking in the direction of the arrows; and FIG. 9 is a sectional view, taken substantially on the line 9—9 of FIG. 7, looking in the direction of the arrows.

The invention has particular reference to means by which an automobile is dried after having been washed and rinsed. In FIG. 1 a car indicated at 1, movable through the car wash building or shed 3 in the conventional manner such as by means of a chain conveyor 2 or other means, has been successively washed and rinsed by fluid emanating from one or more banks of spray nozzles 4 and is moving in the direction of the arrows 5 to be dried. Air is projected from a movable blower unit forming the subject matter of the present invention and generally indicated at 6 and shown within the enclosing line 3 in FIG. 1.

Said dryer or blower unit includes a housing or casing 6' that is supported with its contained elements on a truck or carriage 7 that includes channel beams 8 and other suitable reinforcing or bracing elements. The truck or carriage 7 is provided with supporting wheels or rollers 9 which ride upon tracks 10 which rest upon the ground or floor of the building structure. The wheels or rollers are rotatively mounted in brackets 11 secured to the truck or carriage frame. At least one of the wheels 9 constitutes a driving wheel and it carries a sprocket 12 engaged by a chain 13 which extends around a sprocket 14 driven by reducing gearing contained in a gear box 15 that is in turn driven by a belt 16 from an electric motor 17 supported by the truck or carriage frame.

Extending upwardly from the truck or carriage frame 8 is an upper frame 20 which includes vertical beams 21 connected at the top by cross bars 22. Mounted on the frame 20 is a blower motor 23, having a shaft 25 carrying a pulley 24, engaged by a belt 26 that engages a pulley 27 on the shaft 28 of the rotor of the blower that is contained within the blower housing 29.

The blower housing has an inlet 40 for air and the outlet end of the blower housing is connected into a nozzle structure or air manifold generally indicated at 30. Said nozzle structure or manifold 30 is of inverted U-shape, thus having two opposed, downwardly directed hollow legs 31 and 32 which are connected at the top by a cross channel 33. Each of the legs 31 and 32 has inwardly-directed air outlet openings or jets 34 provided with deflector vanes 35 to thereby direct an air blast inwardly and slightly downwardly against the opposite sides of the car to be dried, substantially as shown in FIG. 5. The cross channel member 33 is provided with a downwardly directed extension 36 having its outlet divided into jet openings by the partitions 37. The above-described arrangement is such that when the blower apparatus is in operation and is moved along on the tracks 10 and relatively to the moving car to be dried, the air ejected from the nozzle structure downwardly from above the top of the car and inwardly against the opposite sides of the car, will rapidly dry the car after it has been rinsed, so that the car, when reaching the outlet or delivery end of the car wash building at the right in FIG. 1, will be clean, dry and shining.

To aid in the support of the nozzle structure or manifold 30, the outer leg thereof, or that shown at 32, is supported by a roller 38 which rides on an elongated flat plate 39 constituting a flat-faced track for the roller.

The above-described arrangement is such that the car 1, after having been washed and rinsed, is moved along in the direction of the arrows 5 in FIG. 1 and it begins to enter under the nozzle structure or air manifold 30 which blows the air against the top and sides of the car to dry it. The air thus projected against the car may, if desired be heated. The dryer is arranged to travel along its rails in company with the moving car but preferably at a slower rate of speed. That is to say, for example, if the car is travelling one foot per second, the dryer might be arranged to travel six inches per second or it can be so arranged that its travel rate can be about two-thirds of the car's rate of speed as moved by the car conveying means. When the dryer reaches a predetermined point in its forward travel, while projecting the drying air against the car during such travel, switching means such as that to be described, will then reverse the drive of the wheel 9 and bring the dryer back to its initial position, or that shown in the dot-and-dash lines in FIG. 2 in readiness for the drying treatment of the next car which reaches it.

In the embodiment of the invention shown in FIG. 6, the dryer has one pair of its grooved wheels 9 resting upon an inverted V-shaped track 10, while its other non-driven pair of wheels 45 rides upon a flat track 46.

In the embodiment of the invention shown in FIGS. 7 to 9 inclusive, the blower structure or manifold 30, substantially similar to that disclosed in FIG. 5, is supported from overhead rather than on the ground. A blower 29 is driven by the belt 26 from the motor 23 in the manner previously described, the motor being hung from the frames 47. At the top of the frame 47 is provided rollers 48 and 48a mounted in brackets 49 on the top of the frame 47. The roller 48 has a flat peripheral face and it rides upon a flat track 50, while roller 48a has a peripheral groove and rides upon an inverted V-shaped track 51. The tracks 50 and 51 are supported by brackets 52, 53 secured to and extending downwardly from the ceiling 3a of the building structure.

The nozzle structure or manifold 30 is supported at its end remote from the blower by a roller 54 rotative in a bracket 55 and on track 56, supported from the brackets 57.

The dryer of this embodiment is caused to travel back and forth at the required speed, by means of chains 58, and 59 which are attached to it and which, at one end engage sprockets 60, 61 carried by the shaft 62 rotative in bearings 63 supported from the ceiling 3a. At its opposite end the chains 58, 59 engage sprockets 64 supported in bearings 66 (FIG. 9). Said shaft 65 carries a sprocket 67 engaged by a chain 68 that engages a sprocket 69 on the shaft of the gear reduction box of the electric motor 70.

The arrangement described is such that the dryer is moved back and forth to the extent required, and at a speed less than the speed of forward movement of the car, to thereby dry the car that is straddled by the nozzle unit 30. At each end of travel of the dryer there is provided a limit reversing switch, that which is located at the end of forward travel of the dryer being indicated at 71 in FIG. 7, and that located at the end of the backward travel of the dryer being shown at 72. Each of these switches has a projecting arm 74 provided with a pin 73 that is contacted by the frame 47 of the dryer when it reaches the end of travel of the dryer in either direction whereupon the direction of drive of the shaft 65 will be reversed and the dryer accordingly propelled in the opposite direction. The same reversing arrangement may be applied to the embodiment shown in FIGS. 1 to 5.

From the foregoing, the operation of the dryer will be readily apparent. The dryer travels along in company with the car to be dried but at a lesser speed than that of the forward movement of the car, and while travelling along with the car, and with the car gradually moving away from it, the air blast from the dryer will dry the car so that by the time it has passed beyond the dryer, the car will emerge dry and clean. When the dryer reaches the limit of its forward movement, the limit switch becomes effective to cause the return of the dryer to the initial position shown in FIG. 1 and in the dot-and-dash lines in FIG. 2, thus placing the dryer in readiness for the reception of the next car, shown at 1a in FIG. 2, to be dried.

Having thus described two embodiments of the invention, it is obvious that the invention is not restricted thereto, but includes all structures coming within the scope of the annexed claims.

What I claim is:

1. An automobile drying apparatus comprising, a nozzle structure of substantially U-shape adapted to straddle a moving car to dry the same while moving in the same direction as the car is being moved, said nozzle having outlet openings positioned to project air against the top and sides of the moving car to dry the same, means independent of the power source of the car for moving the car at a predetermined rate of speed, a carriage by which the nozzle structure is transported, means for limiting the extent of travel of the carriage in one direction, means for driving the carriage in the same direction of movement as that of the car but at a lesser rate of speed than the speed of movement of the car so that the car will, at the end of travel of the carriage, have moved away from the nozzle structure, a blower transported by the carriage and means for operating the blower to force air out of the nozzle structure.

2. An automobile drying apparatus comprising, means independent of the motor of a car for engaging a car to be dried and urging it along a path of travel at a predetermined and controlled rate of speed, tracks arranged along the path of travel of the car, a carriage for travel on said tracks, means for limiting the movement of the carriage in one direction, a blower borne by the carriage, a motor on the carriage for operating the blower, a U-shaped nozzle structure coupled to the outlet of the blower and extending therefrom in a manner to straddle the travelling car, said nozzle structure having air outlets located over the top and also alongside of the sides of the car to thereby project air from the blower against the top and sides of the car, a roller carried by a part of the nozzle structure, a track on which said roller rides, a drive motor carried by the carriage, and transmission means from the motor for moving the carriage in the same direction of movement as that of the car and at a rate of speed of travel less than the rate of forward travel of the car, whereby the car will have advanced beyond the carriage when the carriage reaches the end of its travel in the direction of movement of that of the car.

3. An automobile drying apparatus comprising, means independent of the motive power of a car for moving a car along a definite path and at a predetermined rate of forward speed, a dryer including a nozzle structure straddling the car and projecting drying air against the same, a carriage for moving the nozzle along in the same direction of movement as that of the car and at a slower speed than the forward speed of the car, means for limiting the extent of travel of the carriage in the same direction as the direction of movement of the car whereby the car at the end of travel of the carriage will have moved beyond the blower and means for thereupon moving the carriage back to its starting point and at the forward end of another car to be dried.

References Cited

UNITED STATES PATENTS

| | | | |
|---|---|---|---|
| 2,752,925 | 7/1956 | Friers | 134—123 |
| 2,754,834 | 7/1956 | Mercancy et al. | 134—123 X |
| 2,788,009 | 4/1957 | Lones | 15—312 X |
| 2,896,644 | 7/1959 | Emanuel | 15—312 X |
| 2,948,907 | 8/1960 | Schmidt | 15—312 X |
| 3,073,321 | 1/1963 | Lukas | 15—312 X |
| 3,224,108 | 12/1965 | Flaming | 34—229 X |

FREDERICK L. MATTESON, JR., *Primary Examiner.*

C. R. REMEKE, H. B. RAMEY, *Assistant Examiners.*